(12) United States Patent
Cheng et al.

(10) Patent No.: US 11,054,602 B2
(45) Date of Patent: Jul. 6, 2021

(54) FIBER CABLE TERMINAL AND FIBER DISTRIBUTOR

(71) Applicant: CommScope Telecommunications (Shanghai) Co. Ltd., Shanghai (CN)

(72) Inventors: Xingjun Cheng, Shanghai (CN); Zhaoyang Tong, Shanghai (CN); Lei Liu, Shanghai (CN)

(73) Assignee: CommScope Telecommunications (Shanghai) Co. Ltd., Shanghai (CN)

( * ) Notice: Subject to any disclaimer, the term of this patent is extended or adjusted under 35 U.S.C. 154(b) by 112 days.

(21) Appl. No.: 15/125,889

(22) PCT Filed: Mar. 3, 2015

(86) PCT No.: PCT/IB2015/051543
§ 371 (c)(1),
(2) Date: Sep. 13, 2016

(87) PCT Pub. No.: WO2015/136408
PCT Pub. Date: Sep. 17, 2015

(65) Prior Publication Data
US 2017/0003469 A1    Jan. 5, 2017

(30) Foreign Application Priority Data

Mar. 13, 2014  (CN) .......................... 201420114240X (51) Int. Cl.
*G02B 6/36* (2006.01)
*G02B 6/00* (2006.01)
(Continued)

(52) U.S. Cl.
CPC ......... *G02B 6/4476* (2013.01); *G02B 6/3887* (2013.01); *G02B 6/3897* (2013.01); *G02B 6/4442* (2013.01); *G02B 6/4452* (2013.01)

(58) Field of Classification Search
CPC .. G02B 6/3897; G02B 6/4471; G02B 6/4446; G02B 6/4453; G02B 6/4454;
(Continued)

(56) References Cited

U.S. PATENT DOCUMENTS 4,846,564 A * 7/1989 Caron .................. G02B 6/2835
                                                              385/137
5,073,043 A * 12/1991 DiMarco .............. G02B 6/3802
                                                               385/81
(Continued)

FOREIGN PATENT DOCUMENTS

WO    2008/115795 A1    9/2008

OTHER PUBLICATIONS

International Search Report for corresponding International Patent Application No. PCT/IB2015/051543 dated May 13, 2015, 2 pgs.

*Primary Examiner* — Kaveh C Kianni
*Assistant Examiner* — Hung Q Lam
(74) *Attorney, Agent, or Firm* — Merchant & Gould P.C.

(57) ABSTRACT

Disclosed is a fiber cable terminal which comprises a cable assembly, a cable fixing portion and a thermal shrinkable tube. The cable assembly includes: an inner sheath through which the fiber can pass; and a protection layer provided outside of the inner sheath. The cable fixing portion includes: an insertion portion to be inserted between the protection layer and the inner sheath; and a fixing portion connected with the insertion portion and positioned outside of the protection layer. The thermal shrinkable tube wraps a part of the fixing portion and a part of the protection layer and fixes the cable fixing portion and the 10 cable assembly together. All the members of the fiber cable terminal are pre-assembled into a sealed one-piece, the sealing performance between the cable fixing portion and the protecting layer is thus improved. The fiber cable terminal is mated with the through hole of the supporting body to improve the
(Continued)

sealing performance between the fiber cable terminal and the supporting body.

19 Claims, 6 Drawing Sheets

(51) Int. Cl.
*G02B 6/44* (2006.01)
*G02B 6/38* (2006.01)
(58) Field of Classification Search
CPC .. G02B 6/3887; G02B 6/4442; G02B 6/4476; G02B 6/4452
USPC .... 385/76, 81, 84, 86, 87, 92, 94, 135, 136, 385/139
See application file for complete search history.

(56) References Cited

U.S. PATENT DOCUMENTS

| | | | | |
|---|---|---|---|---|
| 5,142,601 | A * | 8/1992 | Shibata | G02B 6/3821 385/60 |
| 2005/0002621 | A1 | 1/2005 | Zimmel et al. | |
| 2009/0060421 | A1* | 3/2009 | Parikh | G02B 6/4442 385/71 |
| 2011/0222826 | A1* | 9/2011 | Blackburn | G02B 6/3887 385/113 |
| 2011/0280525 | A1* | 11/2011 | Marcouiller | G02B 6/2551 385/99 |
| 2013/0077928 | A1* | 3/2013 | Hsing | H01R 4/72 385/135 |
| 2013/0146355 | A1* | 6/2013 | Strasser | G02B 6/4471 174/72 A |
| 2016/0202441 | A1* | 7/2016 | Claessens | G02B 6/4477 385/113 |

* cited by examiner

FIBER CABLE TERMINAL AND FIBER DISTRIBUTOR

CROSS-REFERENCE TO RELATED APPLICATION

This application is a US National Stage of PCT/IB2015/051543, filed on Mar. 3, 2015, which claims the benefit of Chinese Patent Application No. 201420114240.X filed on Mar. 13, 2014 in the State Intellectual Property Office of China, the whole disclosures of which are incorporated herein by reference. To the extent appropriate, a claim of priority is made to each of the above disclosed applications.

BACKGROUND OF THE INVENTION

Field of the Invention

The embodiments of the present invention relate to a fiber distributor, in particular, to a fiber cable terminal having a cable fixing portion, and a fiber distributor.

Description of the Related Art

In fiber communication, a fiber distributor is used to perform splicing, distribution, adaption and the like of different fibers. For example, in a Fiber-To-The-Home (FTTH) communication system, it is necessary to connect centralized fibers to separate subscribers respectively by using the fiber distributor.

SUMMARY OF THE INVENTION

The problem to be solved by the present invention is to provide a fiber cable terminal including a cable fixing portion, all the members of the fiber cable terminal are pre-assembled into a sealed one-piece, the sealing performance between the cable fixing portion and a protection layer is thus improved.

The present invention further provides a fiber distributor in which the fiber cable terminal is mated with a through hole of a supporting body, the sealing performance between the fiber cable terminal and the supporting body is thus improved.

According to an aspect of the present invention, a fiber cable terminal is provided, the cable terminal comprising:
  a cable assembly including:
    an inner sheath through which the fiber can pass; and
    a protection layer provided outside of the inner sheath;
  a cable fixing portion including:
    an insertion portion to be inserted between the protection layer and the inner sheath; and
    a fixing portion connected with the insertion portion and positioned outside of the protection layer;
  a thermal shrinkable tube which wraps a part of the fixing portion and a part of the protection layer, and fixes the cable fixing portion and the cable assembly together.

According to an exemplary embodiment of the present invention, the cable assembly further comprises: reinforcement strands which are provided between the protection layer and the inner sheath and extend onto a part of the fixing portion, the thermal shrinkable tube further wrapping the reinforcement strands extending onto the fixing portion.

According to an exemplary embodiment of the present invention, the fixing portion comprises:
  a first fixing portion, wherein a first end of the first fixing portion is connected to the insertion portion and the reinforcement strands extend onto the first fixing portion; and
  a second fixing portion connected to a second end of the first fixing portion, the thermal shrinkable tube further wrapping a part of the second fixing portion.

According to an exemplary embodiment of the present invention, the insertion portion is provided with an annular protrusion through which the insertion portion is in an interference fit with the protection layer.

According to an exemplary embodiment of the present invention, the outer diameter of the protection layer containing the insertion portion is substantially equal to the outer diameter of the second fixing portion.

According to an exemplary embodiment of the present invention, a plurality of stripes are provided on the protrusion.

According to an exemplary embodiment of the present invention, the radius of the second fixing portion is substantially equal to a sum of the radius of the first fixing portion and the thickness of reinforcement strands wrapping onto the first fixing portion.

According to an exemplary embodiment of the present invention, an annular groove is provided on a connection portion between the first fixing portion and the second fixing portion, and remaining portions of the ends of reinforcement strands are received in the groove.

According to an exemplary embodiment of the present invention, sealant is provided within the thermal shrinkable tube.

According to a further aspect of the present invention, a fiber distributor is provided, the fiber distributor comprising:
  a plurality of fiber cable terminals as mentioned above;
  a supporting body provided with a plurality of through holes through which the fiber cable terminals pass respectively; and
  a distributing device, wherein the fiber cable terminals extending out of the supporting body are inserted into the distributing device and fibers can pass through the inner sheathes of the fiber cable terminals and extend into the distributing device.

According to an exemplary embodiment of the present invention, the fiber distributor further comprises: a base in which the supporting body can be mounted; and a tail jacket in which the base is partially mounted.

According to an exemplary embodiment of the present invention, the fiber distributor further comprises a rubber piece mounted between the supporting body and the base.

According to an exemplary embodiment of the present invention, in the above fiber distributor, the thermal shrinkable tubes of the fiber cable terminals pass through the through holes respectively in an interference fit manner.

According to an exemplary embodiment of the present invention, a step portion is provided in each of the through holes and an end of the thermal shrinkable tube abuts against the step portion.

According to an exemplary embodiment of the present invention, the inner diameter of each of the through holes decreases gradually towards the step portion in a direction away from the distributing device.

According to an exemplary embodiment of the present invention, at least one rib is provided on the inner wall of the through hole.

According to an exemplary embodiment of the present invention, the outer diameter of the thermal shrinkable tube decreases gradually in a direction towards the protection layer.

According to an exemplary embodiment of the present invention, the fiber distributor further comprises an auxiliary tube mounted on the supporting body, wherein fibers guided out from the distributing device pass through the auxiliary tube.

With the fiber cable terminal and the fiber distributor according to the above various embodiments of the present invention, all the members of the fiber cable terminal may be pre-assembled into a sealed one-piece, in which an interference fit is formed between the cable fixing portion and the protecting layer, so that the sealing performance between the cable fixing portion and the protecting layer is improved. The outer wall of the thermal shrinkable tube of the fiber cable terminal and the plastic supporting body of the fiber distributor are assembled, an interference fit is formed between the thermal shrinkable tube and the through hole of the supporting body, so that the sealing performance between the fiber cable terminal and the supporting body is improved.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 4:
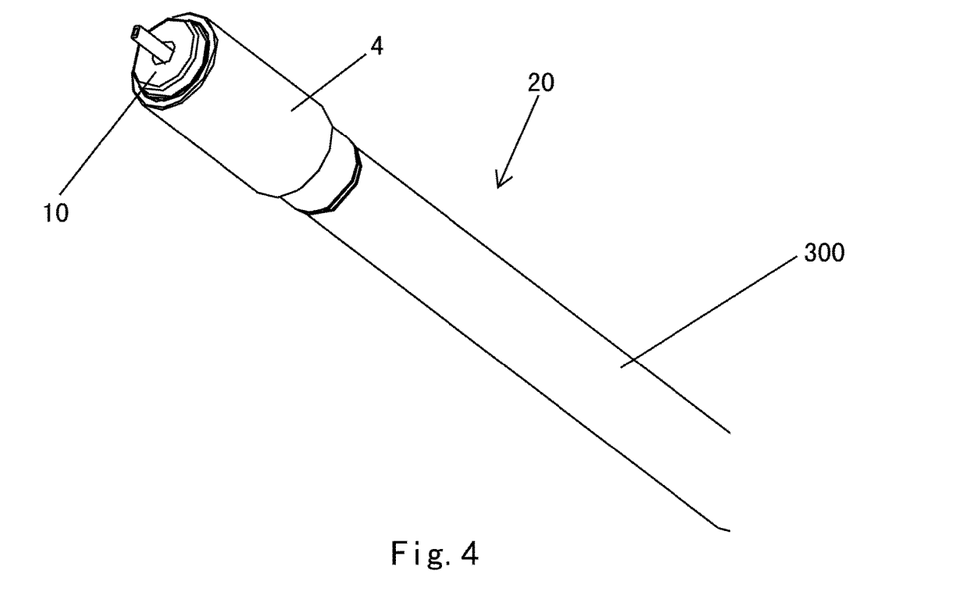
FIG. 4 is a perspective schematic view illustrating a fiber cable terminal according to an embodiment of the present invention.
Figure 5:
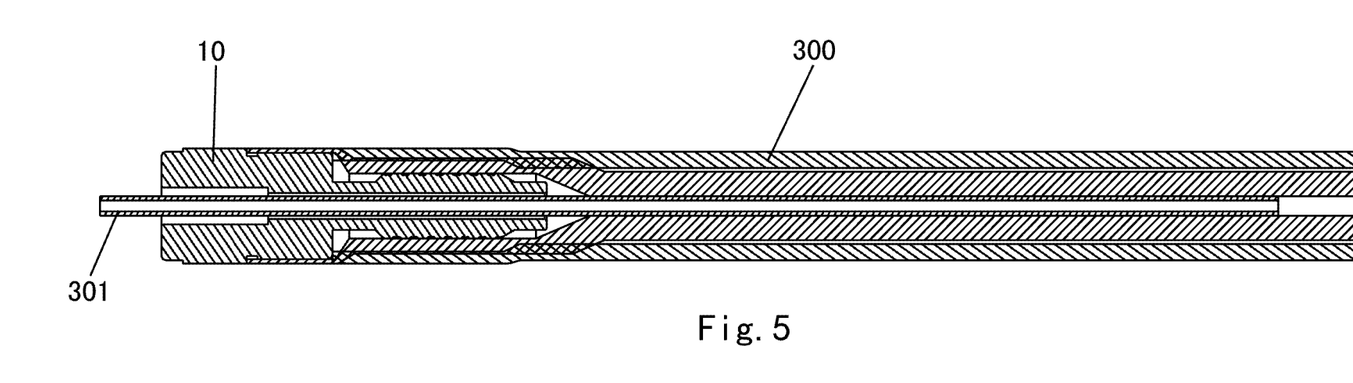
FIG. 5 is a partial longitudinal section view illustrating the cable fixing portion according to an embodiment of the present invention is connected to the cable assembly.
Figure 6:
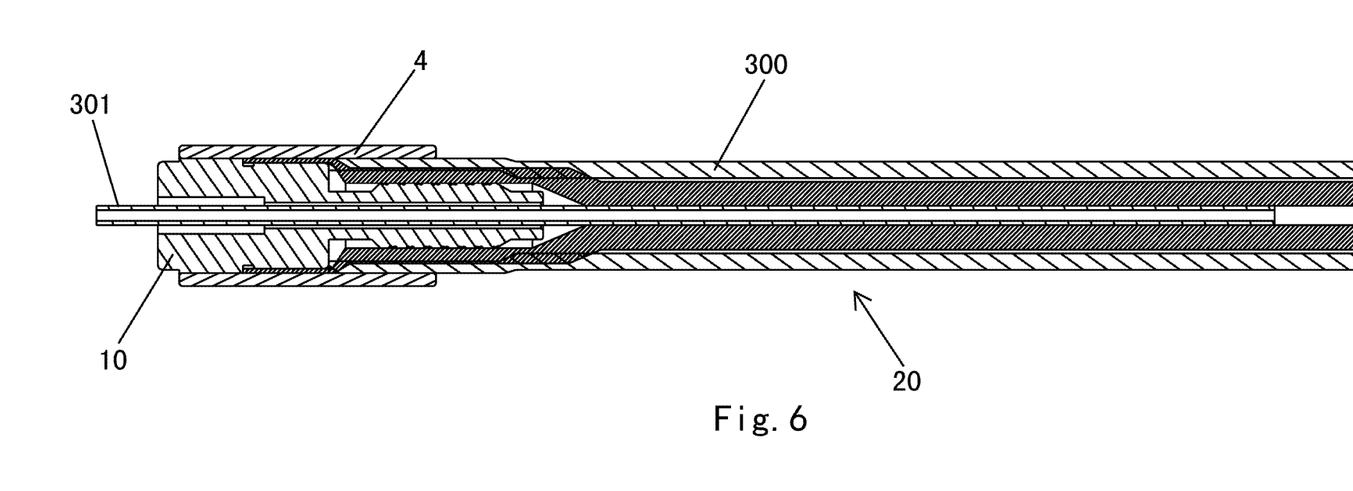
FIG. 6 is a partial longitudinal section view illustrating the fiber cable terminal shown in FIG. 5.
Figure 7:
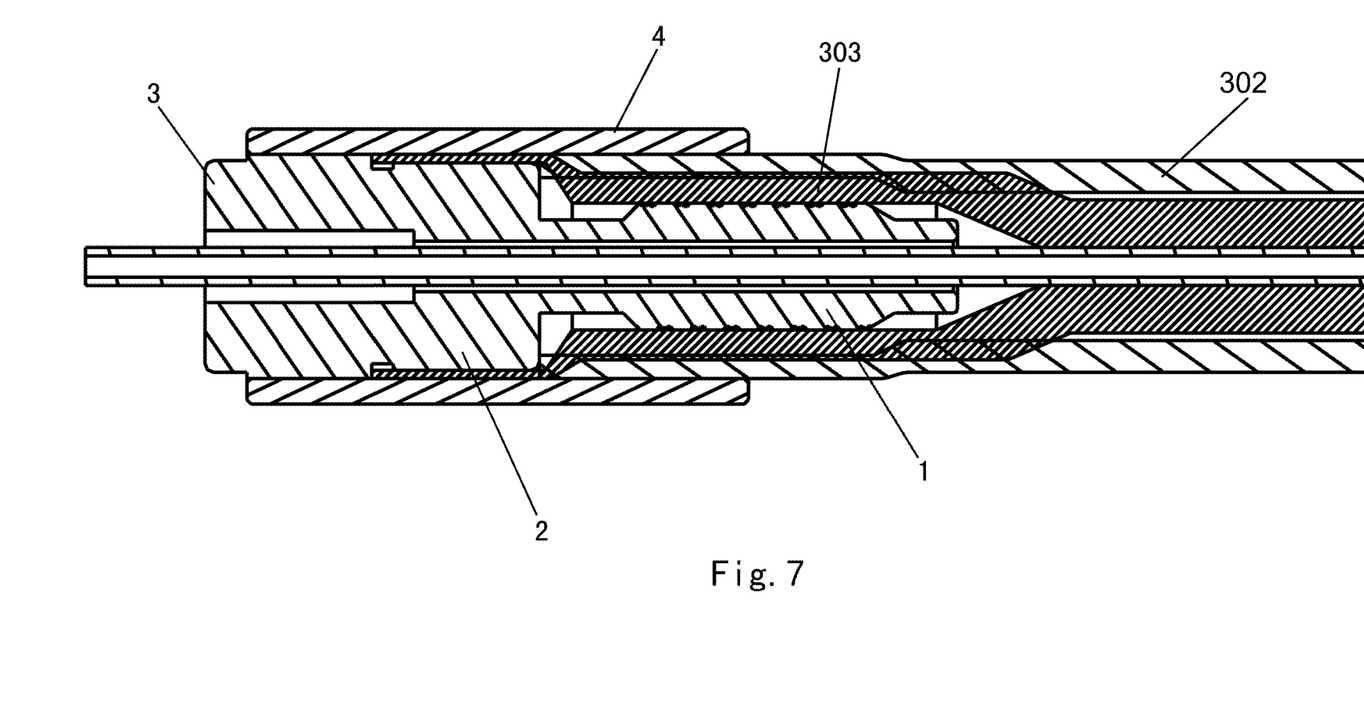
FIG. 7 is an enlarged schematic view illustrating a left side portion of the fiber cable terminal shown in FIG. 6.

According to a general concept of the present invention, there is provided a fiber cable terminal applied on a fiber distributor. The fiber distributor can be applied in the fiber communication and perform splicing, distribution, adaption and the like of different fibers. FIG. 4 is a perspective schematic view illustrating a fiber cable terminal according to one embodiment of the present invention. FIG. 6 is a partial longitudinal section view illustrating a fiber cable terminal shown in FIG. 10.

Figure 1:
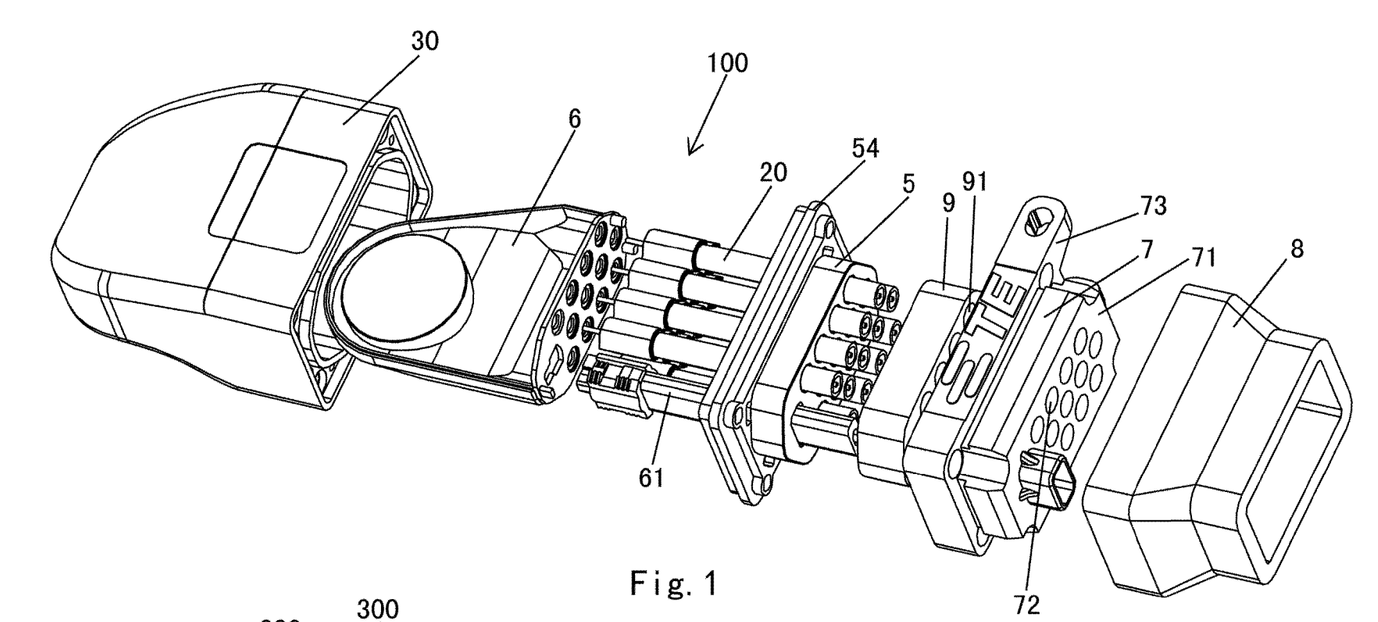
FIG. 1 is an exploded schematic view illustrating a fiber distributor according to an embodiment of the present invention.
Figure 2:
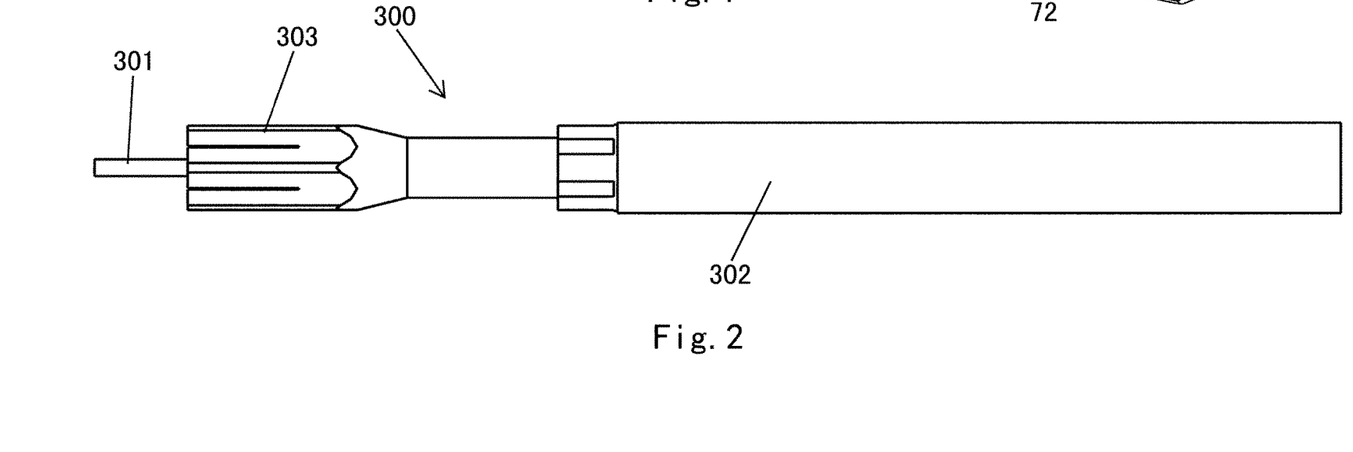
FIG. 2 is a side view illustrating a cable assembly of the fiber distributor according to an embodiment of the present invention.

As shown in FIGS. 1-9, according to an exemplary embodiment of the present invention, a fiber cable terminal 20 is provided, which comprises: a cable assembly 300, a cable fixing portion 10 and a thermal shrinkable tube 4. As shown in FIG. 2, the cable assembly 300 includes: an inner sheath 301 configured to allow a fiber (not shown) to pass therethrough and a protection layer 302 provided outside the inner sheath 301. The cable fixing portion 10 includes: an insertion portion 1 configured to be inserted between the protection layer 302 and the inner sheath 301, and a fixing portion connected with the insertion portion and positioned outside the protection layer 302. The thermal shrinkable tube 4 wraps a part of the fixing portion and a part of the protection layer 302 to fix the cable fixing portion 10 and the cable assembly 300 together.

According to a further exemplary embodiment of the fiber cable terminal 20 of the present invention, the cable assembly 300 further comprises reinforcement strands 303 provided between the protection layer 302 and the inner sheath 301 and extending onto a part of the fixing portion, and the thermal shrinkable tube 4 wraps the reinforcement strands extending onto the fixing portion. Further, the fixing portion includes a first fixing portion 2 and a second fixing portion 3. A first end of the first fixing portion 2 is connected to the insertion portion 1 and the reinforcement strands 303 extend onto the first fixing portion 2. The second fixing portion 3 is connected to a second end of the first fixing portion 2, and the thermal shrinkable tube 4 wraps a part of the second fixing portion 3. As such, the thermal shrinkable tube 4 wraps a part of the second fixing portion 3 and a part of the reinforcement strands 303 exposing out of the protection layer 302 and a part of the protection layer 302, so that the cable fixing portion 20 and the cable assembly 300 are securely fixed together.

Referring to FIGS. 1-8, the cable fixing portion 10 according to an exemplary embodiment of the present invention comprises the insertion portion 1, the first fixing portion 2 and the second fixing portion 3. The insertion portion 1 is inserted between the reinforcement strands 303 positioned within the protection layer 302 and the inner sheath 301 in the cable assembly 300. The first end (the right end shown in FIG. 3) of the first fixing portion 2 is connected to the insertion portion 1, and the reinforcement strands 303 exposing out of the protection layer 302 of the cable assembly 300 are attached to the first fixing portion 2. The second fixing portion 3 is connected to the second end (the left end shown in FIG. 3) of the first fixing portion 2. The thermal shrinkable tube 4 with elasticity wraps a part of the second fixing portion 3 and the reinforcement strands 303 exposing out of the protection layer 302 and a part of the protection layer 302.

In the cable fixing portion 10 of the present invention, the radius of the second fixing portion 3 is substantially equal to a sum of the radius of the first fixing portion 2 and the thickness of reinforcement strands 3 wrapping onto the first fixing portion 2, and the inner sheath 301 exposing out of the protection layer 302 passes through the cable fixing portion 10 and extends out from the second fixing portion 3. The radius of the second fixing portion 3 is greater than the radius of the first fixing portion 2. As such, the thermal shrinkable tube 3 can be smoothly mounted on the cable fixing portion 10.

Figure 3:
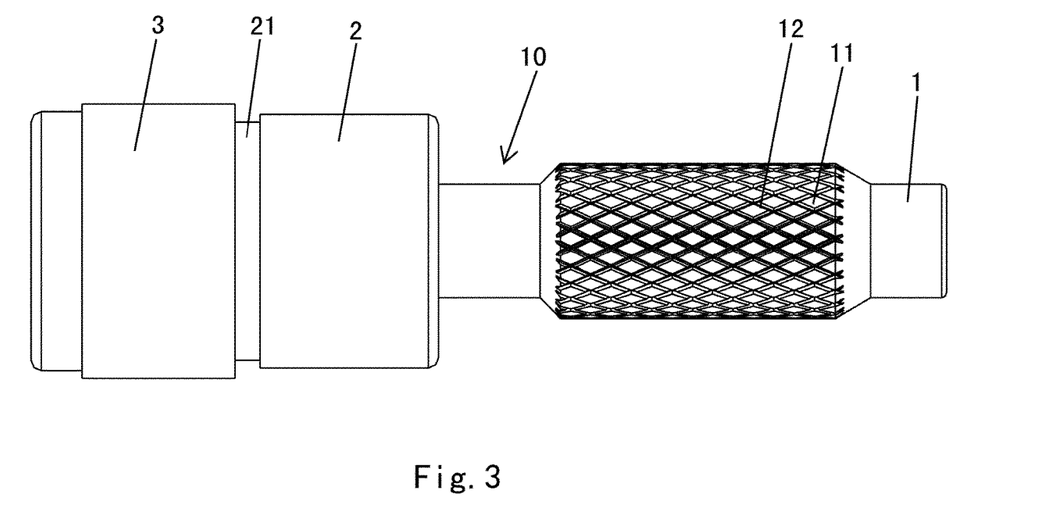
FIG. 3 is a side view illustrating a cable fixing portion according to an embodiment of the present invention.

Referring to FIG. 3, an annular protrusion 11 is provided on the insertion portion 1 such that the insertion portion 1 is in an interference fit with the protection layer 302 through the protrusion 11. Further, in the case that the insertion portion 1 has been inserted into the protection layer 302, the outer diameter of the protection layer 302 containing the insertion portion 1 is substantially equal to the outer diameter of the second fixing portion 3. As such, the thermal shrinkable tube 4 can be smoothly mounted on the cable fixing portion 10 and the protection layer 302 expanded by the protrusion 11 of the insertion portion 1. A plurality of stripes 12 are provided on the projection portion 11 to increase the friction between the insertion portion 1 and the protection layer 302, so that it is not easy for the cable fixing portion 10 to release from the protection layer 302 of the cable assembly 300.

In one embodiment, a sealant may be provided in the thermal shrinkable tube 4 to improve sealing performance between the thermal shrinkable tube 4 and the second fixing portion 3, the reinforcement strands 303 and the protection layer 302. An annular groove 21 is provided on a connection portion between the first fixing portion 2 and the second fixing portion 3, and remaining portions of the ends of reinforcement strands 303 are received in the grooves 21.

FIG. 1 is an exploded schematic view illustrating a fiber distributor according to one embodiment of the present invention. The fiber distributor 100 includes the fiber cable terminals 20 as discussed in the above embodiments, a supporting body 5 and a distributing device 6. The supporting body 5 is provided with a plurality of first through holes 51 through which the fiber cable terminals 20 pass respectively. The fiber cable terminals 20 extending out of the supporting body 5 are inserted into the distributing device 6, and the fibers (not shown) may pass through the inner sheathes 301 of the fiber cable terminals 20 respectively and extend into the distributing device 6, so as to be inserted, directly and collectively, into an independent auxiliary tube 61 in the fiber device 6, or be spliced with mating fibers (not shown) within the auxiliary tube 61 respectively. In an exemplary embodiment, the distributing device 6 may be provided with a fiber splicing device for splicing the fibers and the mating fibers, such as a fiber fusion splicer, a mechanical splicer, and the like.

The fiber distributor 100 according to the present invention further includes a base 7 and a tail jacket 8. The supporting body 5 may be mounted in the base 7 which is partially mounted in the tail jacket 8. The fiber distributor 100 further includes a rubber piece 9 provided between the supporting body 5 and the base 7 to improve sealing performance between the supporting body 5 and the base 7. In particular, the base 7 is formed as a concave structure having a bottom portion 71 in which a plurality of through holes 72 are provided. The piece 9 with elasticity is mounted in the concave structure and has sealing and buffer effect between the supporting body 5 and the base 7. A plurality of through holes 91 are provided in the rubber piece 9, and a part of the base 7 is mounted in the tail jacket 8.

Figure 8:
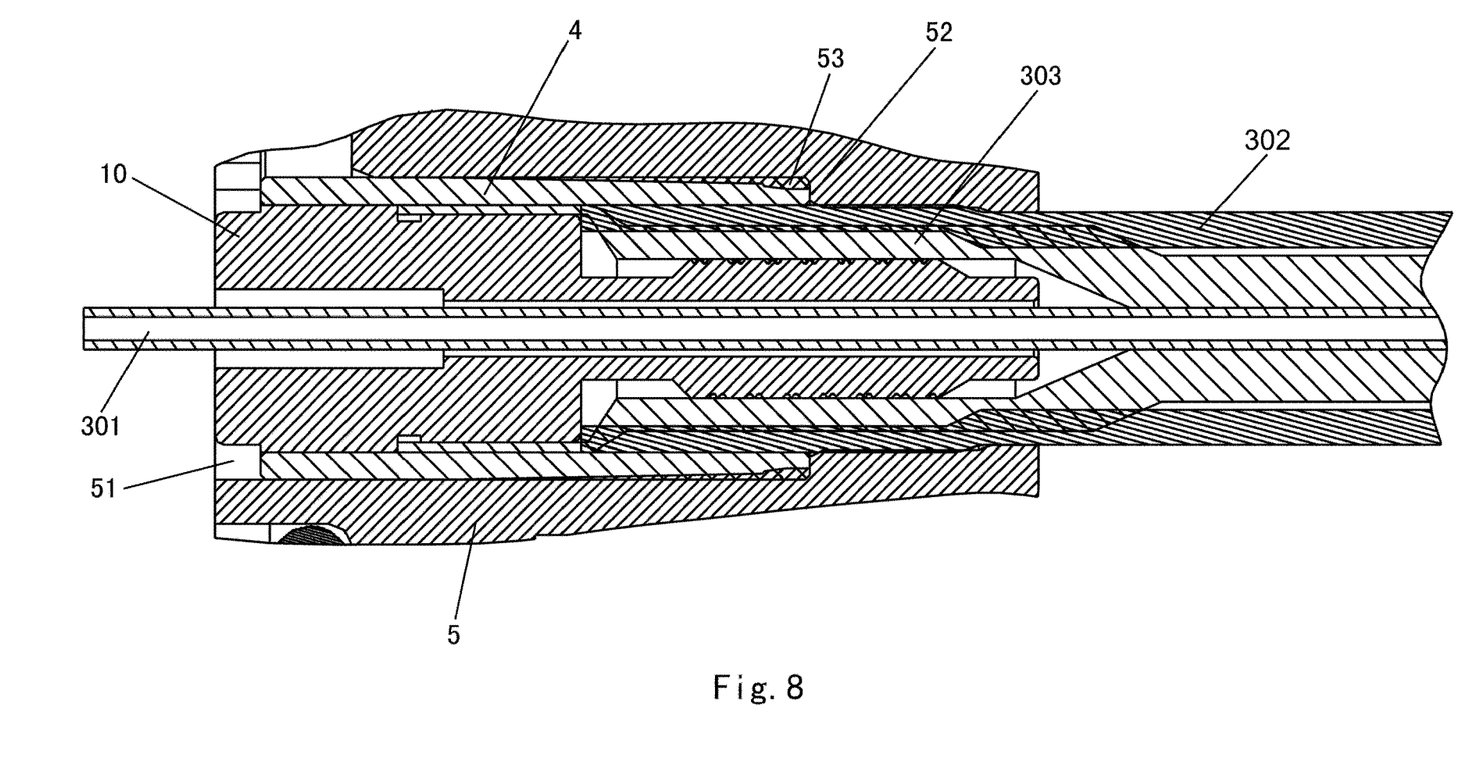
FIG. 8 is a longitudinal section view illustrating a part of the fiber cable terminal mounted in through holes of a support body and a part of the support body.
Figure 9:
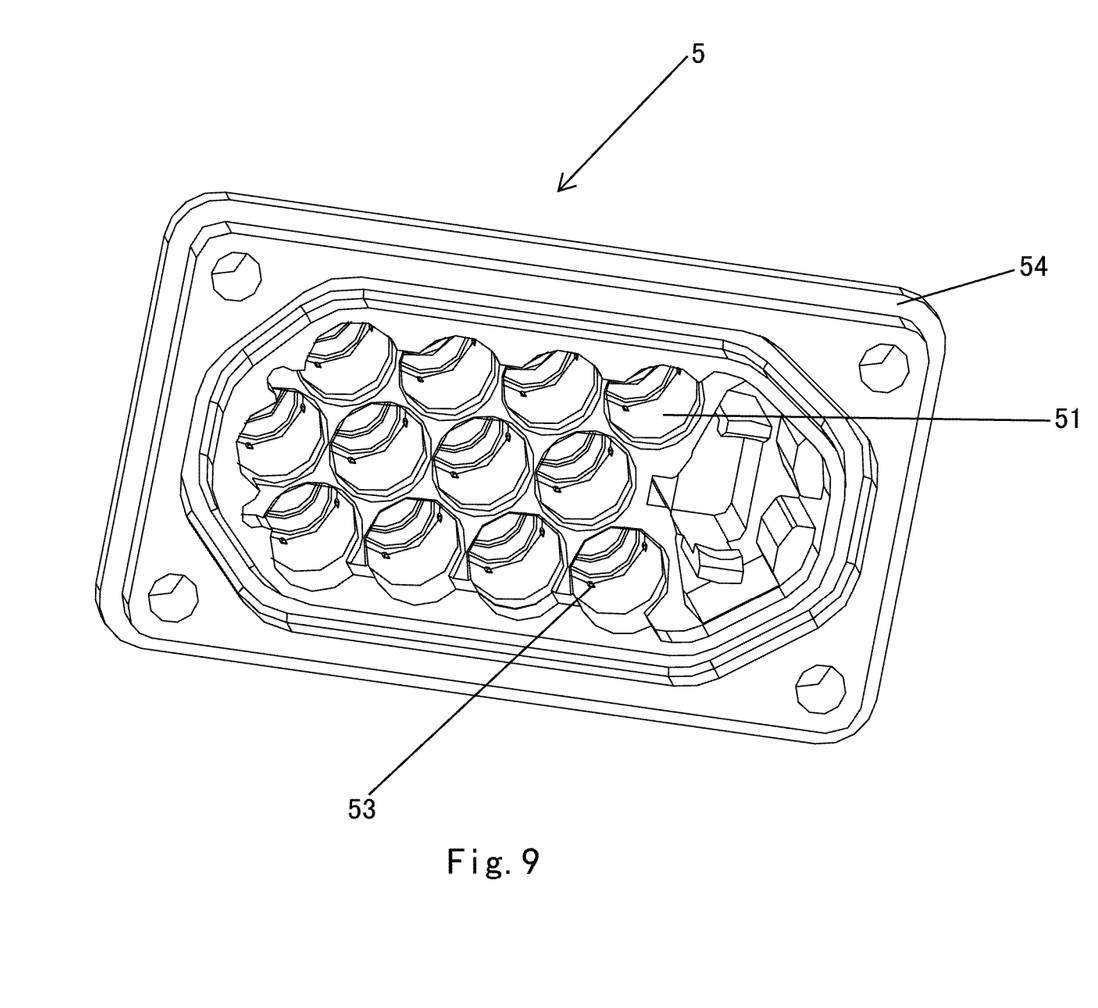
FIG. 9 is a perspective schematic view illustrating the support body of the fiber distributor according to an embodiment of the present invention viewing from one side.

Referring to FIGS. 1, 8 and 9, in the fiber distributor 100 according to an exemplary embodiment of the present invention, the thermal shrinkable tube 4 of the fiber cable terminal 10 passes through the through hole 51 of the supporting body 5 in an interference fit manner. In one embodiment, the supporting body 5 is made of plastic material with flexibility (e.g. artificial or nature rubber), each of the through holes 51 is provided with a step portion 52 therein, and an end of the thermal shrinkable tube 4 abuts against the step portion 52 to prevent the thermal shrinkable tube 4 from being further inserted into the supporting body 5. The inner diameter of each of the through holes 51 decreases gradually towards the step portion 52 in a direction away from the distributing device 6 (the direction from left to right in FIG. 8). That is to say, the inner wall of the through hole 51 has a tapered structure in the direction towards the step portion 52. As such, during inserting the fiber cable terminal 20 into the through hole 51 of the supporting body 5 from left to right in a state shown in FIG. 8, the thermal shrinkable tube 4 of the fiber cable terminal 20 contacts with the through hole 51 more and more tightly because the inner diameter of through hole 51 decreases gradually, thus, the sealing performance between the thermal shrinkable tube 4 and the through hole 51 is improved.

In another embodiment, the outer diameter of the thermal shrinkable tube 4 decreases gradually in a direction towards the protection layer 302, such that during inserting the fiber cable terminal 20 into the through hole 51 of the supporting body 5 from left to right in a state shown in FIG. 8, the thermal shrinkable tube 4 of the fiber cable terminal 20 may also contact with the through hole 51 more and more tightly, thus, the sealing performance between the thermal shrinkable tube 4 and the through hole 51 is improved.

Further, at least one rib 53 is provided on the inner wall of the through hole 51. Because both the thermal shrinkable tube 4 and the supporting body 5 are flexible and resilient, the rib 53 may be partially embedded in the thermal shrinkable tube 4, which may prevent the thermal shrinkable tube 4 from rotating relative to the through hole 51.

The fiber distributor 100 according to the present invention further includes an auxiliary tube 61 mounted in the supporting body 5, and the fibers (not shown) led out from the distributing device 6 or the mating fibers (not shown) having mated with the fibers pass through the auxiliary tube 61. Accordingly, through holes through which the auxiliary tube 61 passes are provided in the supporting body 5, the rubber piece 9 and the base 7. The fiber distributor 100 further includes a cover 30 for covering the distributing device 6. A supporting frame 54 is provided at the periphery of the supporting body 5, and a base frame 73 is provided at the periphery of the base 7. The supporting frame 54 and the base frame 73 are attached in the cover 30 through a connection part such as a bolt. The tail jacket 8 may be mounted on the base 7 in an interference fit manner. It should be noted that the tail jacket 8 may be omitted.

The operation process for distributing or splicing fibers by means of the fiber distributor 100 according to the present invention will be described with reference to FIGS. 1-8.

Firstly, referring to FIGS. 2-6, the thermal shrinkable tube 4 is sleeved onto the protection layer 302 in advance; the insertion portion 1 of the cable fixing portion 10 is inserted between the reinforcement strands 303 and the inner sheath 301 to expand the protection layer 302 of the cable assembly 300; the reinforcement strands 300 wrap onto the first fixing portion 2 of the cable fixing portion 10; the thermal shrinkable tube 4 is pulled along a direction from right to left shown in FIG. 6, and one end of the thermal shrinkable tube 4 is sleeved onto the second fixing portion 3 of the cable fixing portion 10 while the other end thereof is sleeved onto the expanded protection layer 302, thus the fiber cable terminal 20 shown in FIG. 2 is formed.

Thereafter, the rubber piece 9 is mounted in the concave structure of the base 7; a part of the supporting body 5 is then inserted into the concave structure of the base 7 and abuts against the rubber piece 9, and the supporting frame 54 and the base frame 73 are joined together; the base 7 is mounted in the tail cover 8. The thermal shrinkable tube 4 of the fiber cable terminal 20 is in a tight fit with the through hole 51 of the supporting body 5.

Thereafter, the fiber cable terminal 20 is inserted from the left side of the supporting body 5 as shown in FIG. 1, through the supporting body 5 and the rubber piece 9, and then into the through hole of the base 7; the fibers to be distributed or spliced are inserted into the inner sheathes 301 of the fiber cable terminals 20 respectively from the right side of FIG. 1, and extend out from the left ends of the fiber cable terminals 20 shown in FIG. 1; the left ends of the fiber cable terminals 20 are inserted into the distributing device 6 such that the exposed fibers are inserted into the distributing device 6 and the fibers can be wound in the distributing device 6 to be stored; thereafter, the fibers are inserted into the auxiliary tube 61 respectively and extend out of the tail jacket 8.

In another embodiment, the fibers may also be spliced with the mating fibers in the distributing device 6 through a fiber splicer, and the spliced optic fibers are inserted into the auxiliary tube 61 respectively and extend out of the tail jacket 8. In this case, the fiber distributor according to the present invention can be used as a fiber connector.

The fibers extending out of the tail jacket 8 may be connected collectively to the fiber connector, and all the fibers extending into the tail jacket 8 may be connected to the fiber connectors of the subscribers, so that FTTH is obtained.

By using the above operations, multiple fibers may be mounted into the fiber distributor of the present invention through the fiber cable terminals 20, and the distribution of fibers or the splicing with the mating fibers is realized in the distributing device. It should be noted that the mating fibers may be pre-connected into the distributing device 6 through the auxiliary tube 61.

With the fiber cable terminal and the fiber distributor according to the above various embodiments of the present invention, all the members of the fiber cable terminal may be pre-assembled into a sealed fiber cable terminal of a one-piece type, in which an interference fit is formed between the cable fixing portion and the protecting layer, so that the sealing performance between the cable fixing portion and the protecting layer is improved. The outer wall of the thermal shrinkable tube of the formed fiber cable terminal and the plastic supporting body of the fiber distributor are assembled, and an interference fit is formed between the thermal shrinkable tube and the through hole of the supporting body, so that the sealing performance between the fiber cable terminal and the supporting body is improved, and at the same time, the supporting device provides a force large enough to hold the fiber cable terminal, thus, the possibility of damaging the fiber distributor in actual operation is minimized.

Further, the cable fixing portion according to the present invention, together with the thermal shrinkable tube, may fix firmly the reinforcement strands (Kevlar in general) and the protection layer, thus, retention force and the sealing effect for the cable are improved. The inner wall of the through hole of the supporting body provides a support for the thermal shrinkable tube, preventing the wall of the thermal shrinkable tube from buckling due to pulling the cable.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber cable terminal extending along a longitudinal axis to a front end of the fiber cable terminal, comprising:
a cable assembly including:
an inner sheath through which the fiber can pass; and
a protection layer provided outside of the inner sheath;
a cable fixing portion including:
an insertion portion to be inserted between the protection layer and the inner sheath; and
a fixing portion connected with the insertion portion and positioned outside of the protection layer, the fixing portion including a first fixing portion and a second fixing portion in front of the first fixing portion, the second fixing portion having a wide portion with a largest outer diameter perpendicular to the longitudinal axis that is larger than a largest outer diameter of the first fixing portion; and
a thermal shrinkable tube wrapping the first fixing portion and at least a portion of the second fixing portion, such that the thermal shrinkable tube extends along the longitudinal axis over the first fixing portion and over the largest outer diameter of the wide portion of the second fixing portion, the thermal shrinkable tube further wrapping a part of the protection layer, and fixing the cable fixing portion and the cable assembly together,
wherein an outer diameter of the thermal shrinkable tube perpendicular to the longitudinal axis remains substantially the same along the first fixing portion and the second fixing portion.

2. The fiber cable terminal of claim 1, wherein the cable assembly further comprises: reinforcement strands which are provided between the protection layer and the inner sheath and extend onto a part of the fixing portion, the thermal shrinkable tube further wrapping the reinforcement strands extending onto the fixing portion.

3. The fiber cable terminal of claim 2,
wherein a first end of the first fixing portion is connected to the insertion portion and the reinforcement strands extend onto the first fixing portion.

4. The fiber cable terminal of claim 3, wherein the insertion portion is provided with an annular protrusion through which the insertion portion is in an interference fit with the protection layer.

5. The fiber cable terminal of claim 4, wherein an outer diameter of the protection layer containing the insertion portion is substantially equal to an outer diameter of the second fixing portion.

6. The fiber cable terminal of claim 4, wherein a plurality of stripes are provided on the protrusion.

7. The fiber cable terminal of claim 3, wherein a radius of the second fixing portion is substantially equal to a sum of the radius of the first fixing portion and a thickness of the reinforcement strands wrapping onto the first fixing portion.

8. The fiber cable terminal of claim 7, wherein an annular groove is provided on a connection portion between the first fixing portion and the second fixing portion, and remaining portions of the reinforcement strands are received in the groove.

9. The fiber cable terminal of claim 1, wherein sealant is provided within the thermal shrinkable tube.

10. A fiber distributor comprising:
a plurality of fiber cable terminals, each of the fiber cable terminals extending along a longitudinal axis to a front end of the fiber cable terminal, comprising:
a cable assembly including:
an inner sheath through which the fiber can pass; and
a protection layer provided outside of the inner sheath;
a cable fixing portion including:
an insertion portion to be inserted between the protection layer and the inner sheath; and
a fixing portion connected with the insertion portion and positioned outside of the protection layer, the fixing portion including a first fixing portion and a second fixing portion in front of the first fixing portion, the second fixing portion having a wide portion with a largest outer diameter perpendicular to the longitudinal axis that is larger than a largest outer diameter of the first fixing portion; and
a thermal shrinkable tube wrapping the first fixing portion and at least a portion of the second fixing portion, such that the thermal shrinkable tube extends along the longitudinal axis over the first fixing portion and over the largest outer diameter of the wide portion of the second fixing portion, the thermal shrinkable tube further wrapping a part of the protection layer, and fixing the cable fixing portion and the cable assembly together;
a supporting body provided with a plurality of through holes through which the fiber cable terminals pass respectively; and
a distributing device, wherein the fiber cable terminals extending out of the supporting body are inserted into the distributing device and fibers can pass through the inner sheaths of the fiber cable terminals and extend into the distributing device,
wherein an outer diameter of each of the thermal shrinkable tubes perpendicular to the longitudinal axis remains substantially the same along the first fixing portion and the second fixing portion.

11. The fiber distributor of claim 10, further comprising:
a base in which the supporting body can be mounted; and
a tail jacket in which the base is partially mounted.

12. The fiber distributor of claim 11, further comprising a rubber piece mounted between the supporting body and the base.

13. The fiber distributor of claim 10, wherein the thermal shrinkable tubes of the fiber cable terminals pass through the through holes respectively in an interference fit manner.

14. The fiber distributor of claim 13, wherein a step portion is provided in each of the through holes and an end of the thermal shrinkable tube abuts against the step portion.

15. The fiber distributor of claim 14, wherein an inner diameter of each of the through holes decreases gradually towards the step portion in a direction away from the distributing device.

16. The fiber distributor of claim 10, wherein at least one rib is provided on the inner wall of the through hole.

17. The fiber distributor of claim 10, further comprising an auxiliary tube mounted on the supporting body, wherein fibers led out from the distributing device pass through the auxiliary tube.

18. A fiber cable terminal extending along a longitudinal axis to a front end of the fiber cable terminal, comprising:
a sealed one-piece of a cable assembly, a cable fixing portion, and a thermal shrinkable tube, the cable assembly and the fixing portion being fixed together with the thermal shrinkable tube, the sealed one-piece being configured to receive an optical fiber;
the cable assembly including:
an inner sheath through which the fiber can pass; and
a protection layer provided outside of the inner sheath;
the cable fixing portion including:
an insertion portion inserted between the protection layer and the inner sheath; and
a fixing portion connected with the insertion portion and positioned outside of the protection layer, the fixing portion including a first fixing portion and a second fixing portion in front of the first fixing portion, the second fixing portion having a wide portion with a largest outer diameter perpendicular to the longitudinal axis that is larger than a largest outer diameter of the first fixing portion;
wherein the thermal shrinkable tube wraps the first fixing portion, at least a portion of the second fixing portion, and a part of the protection layer, and fixes the cable fixing portion and the cable assembly together to form the sealed one-piece, the thermal shrinkable tube extending along the longitudinal axis over the first fixing portion and over the largest outer diameter of the wide portion of the second fixing portion; and
wherein an outer diameter of the thermal shrinkable tube perpendicular to the longitudinal axis remains substantially the same along the first fixing portion and the second fixing portion.

19. A fiber cable terminal, comprising:
a cable assembly including:
an inner sheath through which the fiber can pass;
a protection layer provided outside of the inner sheath; and
reinforcement strands provided between the protection layer and the inner sheath;
a cable fixing portion including:
an insertion portion to be inserted between the protection layer and the inner sheath; and
a fixing portion connected with the insertion portion, the fixing portion including:
a first fixing portion, wherein a first end of the first fixing portion is connected to the insertion portion; and
a second fixing portion connected to a second end of the first fixing portion; and
a thermal shrinkable tube which wraps a part of the fixing portion that is outside of the protection layer and a part of the protection layer, and fixes the cable fixing portion and the cable assembly together, wherein an annular groove is provided on a connection portion between the first fixing portion and the second fixing portion, the annular groove being configured to receive portions of the reinforcement strands.

* * * * *